Dec. 30, 1958  R. C. MOTT  2,866,603

THERMOSTAT ADAPTER

Filed June 6, 1955

INVENTOR.
RICHARD C. MOTT

BY Joseph E. Ryan

ATTORNEY

United States Patent Office 2,866,603
Patented Dec. 30, 1958

2,866,603

THERMOSTAT ADAPTER

Richard C. Mott, Chicago, Ill., assignor to Minneapolis-Honeywell Regulator Company, Minneapolis, Minn., a corporation of Delaware Application June 6, 1955, Serial No. 513,559

4 Claims. (Cl. 236—79)

My invention relates to apparatus for mounting and connecting thermostats and more particularly to an adapter unit designed to mount and connect a pneumatic thermostat to control air lines.

In the past pneumatic thermostats have required rather expensive and complex installations to connect the control air lines of the pneumatic system to the thermostat. The metallic tubing in the air lines generally required special fittings and tools for installation and maintenance of the equipment. In addition because the metallic tubes of the air line were not readily deformable, it was necessary to have accurate alignment of parts so that the thermostat could be connected to the air line to insure that no air leaks would exist in the system. Maintenance and repair of the thermostat generally required removal of the device from the permanent base upon which it was mounted and through which the air lines were connected and such removal presented all the problems of the initial installation.

The present invention is directed to a simplified adapter or mounting for a pneumatic type thermostat in which the thermostat element may be removed from the base assembly for calibration and repair or maintenance readily without requiring any special uncoupling or disturbance of the permanently installed air lines. The apparatus also permits ease of installation of the thermostat through a simplified connection between the air lines and the thermostat.

It is therefore an object of this invention to provide an improved mounting for pneumatic thermostats which facilitates the ease of assembly and disassembly of a pneumatic thermostat for installation, maintenance and repair.

It is also an object of this invention to provide an improved thermostat mounting which is simple in design and economical to manufacture and install.

It is further an object of this invention to provide in an improved thermostat adapter an improved junction between the pneumatic control lines and the thermostat elements in which the metallic control lines are connected to the thermostat sealing member surrounding the tubing to seal the junction.

These and other objects of this invention will become apparent from a reading of the attached description together with the drawings wherein.

Figure 1:
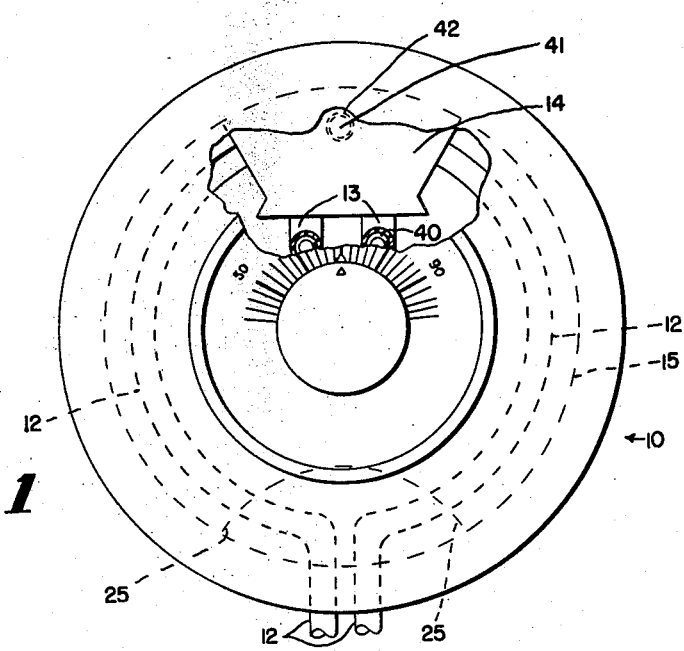
Figure 1 is a plan view of the adapter with a portion of the thermostat removed.
Figure 2:
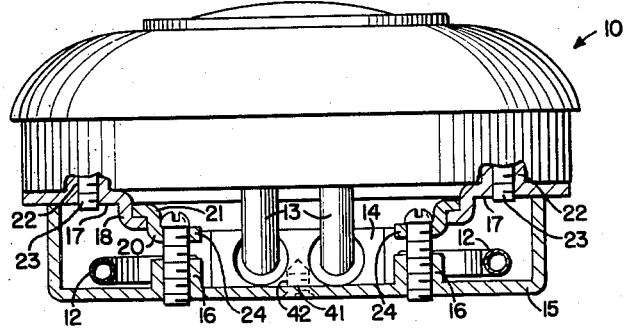
Figure 2 is a side elevation view of an improved adapter with the thermostat mounted thereon.
Figure 3:
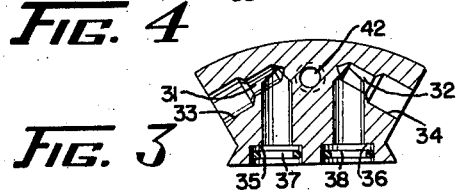
Figure 3 is a sectional view of the coupling or junction member of the adapter.
Figure 5:
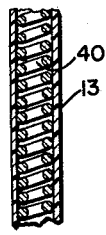
Figure 5 is a view of a piece of plastic tubing with support means therein.

In Figures 1 and 2 there is shown a plan and side elevation views of my improved adapter or thermostat mounting including a thermostat element mounted thereon, the thermostat being generally indicated at 10 and the mounting at 11. As is conventionally done, the mounting is adapted to be permanent wherein the air lines or control air passages such as are indicated at 12 are permanently connected thereto. Air passages in the thermostat 10 are connected through plastic tubing 13 into an adapter indicated at 14 the details of which will be later described. As will be seen in Figure 2, the base mounting 11 is comprised of an annular flange or base 15 having a plurality of apertured hubs 16 therein by means of which the base may be permanently secured to the object upon which the thermostat is to be connected such as a wall. Suitable screw means are utilized to connect this member to the object. Positioned on base 15 is a flange member 17 to which the thermostat 10 is adapted to be connected. Flange 17 is annular in form and has a shoulder portion 18 in which is positioned a connecting ring 20 having a shoulder 21 which fits into the shoulder portion 18 of flange 17. Flange 17 also includes a mounting flange 24 with aperture aligned with the aperture of hubs 16 of base 15 such that the screw means threaded therethrough and into the object secure the parts in assembled relationship and to the object. Flange 17 also includes boss members 22 with tapped apertures therethrough by means of which the thermostat is adapted to be secured to flange member 17, such as by screws 23. As shown in Figure 1, base member 15 has an opening 26 therein through the air lines 12 to the thermostat line to pass either through the object or along the surface of the object. Also included in the base 15 is an aperture 25 through which the air lines 12 for the thermostat are passed. Base 15 mounts in addition junction member or coupling 14, best shown in Figure 3, having a pair of passages 31, 32 therethrough by means of which the air lines are connected to the thermostat. Passage 31 has at one extremity an enlarged shoulder portion indicated at 33 into which an air line 12 could be inserted and secured by suitable means such as silver solder or mechanical pipe connection. Passage 32 has a similar shoulder portion 34 designed to receive the other air line 12 for the thermostat, this air line being secured in a similar manner. The opposite extremities of passages 31, 32 also include shoulder portions 35, 36 respectively in which are positioned O rings or annular rubber sealing members 37, 38 respectively. Plastic tubing 13 for the thermostat which is permanently connected to the thermostat passages through suitable means not shown is adapted to be fitted into the shoulder portions 35, 36 of the passages 31, 32 respectively to be encircled by the O rings or sealing members 37, 38 and snugly positioned therein with an airtight seal formed between the junction member 14 and the plastic tubing. As will be evident in Figure 3, the shoulder or recess portions 35, 36 of the passages 31, 32 have a uniform diametrical dimension which is substantially the same as the diametrical dimension of the sealing ring 37, 38 such that the rings may be readily inserted into the shoulder portions to be simply removed but will fit snugly therein to form a seal therebetween. Plastic tubing or pipes 13 extend through the open end of base 15 and open central portion of flanges 17 and ring 20, as best seen in Figure 2 to the junction member 14. The tubing 13 has positioned therein as shown in Figure 5 suitable support means 40, such as a helical spring to facilitate bending of the tubing and pressure variations with collapse or pinching of the same to stop or impede the air flow therethrough. Junction member 14 is secured to the base member through a suitable screw means 41 which threads through an aperture in the base member 15 and into a tapped aperture 42 in the junction member 14 to securely mount the same on the base member.

This improved thermostat mounting or adapter provides the means by which the adapter member may be permanently secured to the wall or surface upon which the thermostat is to be connected and with the control air lines permanently connected thereto by means of permanent connections to the junction member 14. The thermostat 10, however, may be readily installed merely by inserting the plastic tube lines from the thermostat into the junction member 14 with the seal members 37, 38 sealing the thermostat to the plastic tubes 13 to prevent any air leaks in the apparatus. Spring means 40 within tubes 13 prevents pinching or collapse of the same and facilitates bending during installation. The thermostat is thereafter mounted on the flange member 17. During the period of repair or maintenance, with the thermostat removed, a simple clip, not shown, may be positioned over the openings 35, 36 in the junction member to seal the air lines or a spare piece of tubing may be inserted into the junction member to connect branch and main air lines and prevent air leakage to the atmosphere.

Figure 4:
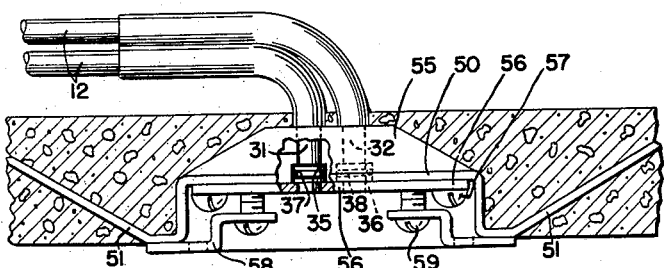
Figure 4 is another embodiment of the adapter construction.

The embodiment shown in Figure 4 utilizes a slightly different base member designed for particular use in masonry type of construction in which a base member is secured between blocks and in the mortar joints. Thus, in Figure 4, it will be seen that the base member is comprised of a main plate 50 with extending finger portions 51 adapted to be positioned between the blocks or in the mortar for permanent installation. The air lines 12 are brought up between the blocks to the back of base 50 and inserted through the apertures in a junction member shown at 55 formed integral with base 50 or suitably attached thereto such as by soldering having similar passages and sealing members 31, 32, 37, 38 as in the before mentioned device. Junction member 55 includes the recesses 35, 36 into which O rings 37 and 38 are positioned and which are shown herein as being retained by means of a flange member 56 secured to base 50 and junction member 55 by screws 57. If desired, the flange 56 may be omitted since the rings are of such dimension as to be readily inserted into and snugly fit the recesses 35, 36 to provide an air-tight seal with the walls of the junction member 55. Flange 56 has apertures therein sufficient to accommodate the plastic tubing. A mounting flange 58 is connected to the base 50 by means of screws 59, the mounting flange providing a means through which the thermostat may be mounted on the base. In this embodiment as in the before mentioned embodiment, the air lines are connected to the junction or adapter 55 by means of silver solder or other suitable connection. In this arrangement also the plastic tubing lines from the thermostat include the spring support 40 and are adapted to be inserted into the apertures in flange 56 and in the junction 55 to be sealed by the annular sealing members 37, 38 but allowing for ease in disassembly or removal. In considering this invention, it should be remembered that this disclosure is intended to be illustrative only and that the invention should be determined only by the appended claims.

I claim as my invention:

1. An adapter for pneumatic thermostats comprising, a base member adapted to be permanently secured to an object upon which said thermostat is to be attached, a flange member secured to said base member and adapted to mount a thermostat thereon, a pneumatic junction box mounted on said base member, a pair of passageways through said junction box, one extremity of each passageway having a portion adapted to receive metallic air lines to be permanently connected thereto, the opposite extremity of each passageway having a recessed area of uniform dimension, an annular rubber sealing member having a similar dimension to the recessed area positioned in each of said recessed areas and abutting the peripheral surfaces thereof in an air tight seal, flexible plastic tubes inserted into said opposite extremities of said passageways and through said annular sealing members to seal said tubes in said passageway, said tubes being adapted to be connected to the air lines of the thermostat to provide a removable airtight connection between the thermostat and said junction box.

2. An adapter for pneumatic thermostats comprising, a base member adapted to be permanently secured to an object upon which said thermostat is to be attached, a flange member secured to said base member and adapted to mount a thermostat thereon, a pneumatic junction box mounted on said base member, a pair of passageways through said junction box, one extremity of each passageway having a portion adapted to receive metallic air lines to be permanently connected thereto, the opposite extremity of each passageway having a recessed area of uniform diametrical dimension, an annular rubber sealing member having a slightly larger diametrical dimension than the recessed area and positioned in each of said recessed areas and abutting the peripheral surfaces thereof, and flexible plastic tubes with support means therein inserted into said opposite extremities of said passageways and through said annular sealing members to seal said tubes in said passageways, said tubes being adapted to be connected to the air lines of the thermostat to provide a removable airtight connection between the thermostat and said junction box, said base member including apertures therein to provide passageways for said metallic air lines and said plastic tubes to said junction box.

3. An adapter for pneumatic thermostats comprising, a base member adapted to be permanently secured to an object upon which said thermostat is to be attached, a flange member secured to said base member and adapted to mount a thermostat thereon, a pneumatic junction box mounted on said base member, a plurality of passageways through said junction box, one extremity of each passageway having a portion adapted to receive metallic air lines to be permanently connected thereto, the opposite extremity of each passageway terminating in a cylindrical recess, an annular rubber sealing member having a slightly larger diametrical dimension than the cylindrical recess and positioned in each of said cylindrical recesses and abutting the peripheral surfaces thereof in an air tight seal, flexible plastic tubes inserted into said opposite extremities of said passageways and through said annular sealing members sealing said tubes in said passageways, said tubes being adapted to be connected to the air lines of the thermostat to provide a removable airtight connection between the thermostat and said junction box.

4. An adapter for pneumatic thermostats comprising, a base member adapted to be permanently secured to an object upon which said thermostat is to be attached, a flange member secured to said base member and adapted to mount a thermostat thereon, a pneumatic junction box mounted on said base member, a plurality of passageways through said junction box, one extremity of each passageway having a portion adapted to receive metallic air lines to be permanently connected thereto, the opposite extremity of each passageway terminating in a cylindrical recess, an annular rubber sealing member having a slightly larger diametrical dimension than the cylindrical recess and positioned in each of said cylindrical recesses and abutting the peripheral surfaces, thereof in an air tight seal, flexible plastic tubes inserted into said opposite extremities of said passageways and through said annular sealing members sealing said tubes in said passageways, and helical spring means within said plastic tubes, said tubes being adapted to be connected to the air lines of the thermostat to provide a removable airtight connection between the thermostat and said junction box.

References Cited in the file of this patent

UNITED STATES PATENTS

| | | |
|---|---|---|
| 243,396 | Pfarre | June 28, 1881 |
| 756,140 | Reid | Mar. 29, 1904 |

(Other references on following page)

UNITED STATES PATENTS

| | | |
|---|---|---|
| 884,275 | Haywood | Apr. 7, 1908 |
| 884,321 | Davis | Apr. 7, 1908 |
| 1,365,812 | Bonnet | Jan. 18, 1921 |
| 1,873,590 | James | Aug' 23, 1932 |
| 2,302,707 | Mejean | Nov. 24, 1942 |
| 2,469,851 | Stecher et al. | May 10, 1949 |
| 2,647,770 | Tollefsbol | Aug. 4, 1953 |

FOREIGN PATENTS

| | | |
|---|---|---|
| 73,538 | Austria | July 10, 1917 |